US010427386B2

(12) United States Patent
Demange et al.

(10) Patent No.: US 10,427,386 B2
(45) Date of Patent: Oct. 1, 2019

(54) SEMI-FINISHED PRODUCT MANUFACTURED FROM PREPREG, THREE-DIMENSIONAL PREFORMED BODY AND OVERMOLDED PART

(71) Applicant: Compagnie Plastic Omnium, Lyons (FR)

(72) Inventors: Jean-Yves Demange, Amberieu en Bugey (FR); Richard Herault, Genas (FR)

(73) Assignee: Compagnie Plastic Omnium, Lyons (FR)

( * ) Notice: Subject to any disclaimer, the term of this patent is extended or adjusted under 35 U.S.C. 154(b) by 195 days.

(21) Appl. No.: 15/037,803

(22) PCT Filed: Nov. 21, 2014

(86) PCT No.: PCT/IB2014/066239
§ 371 (c)(1),
(2) Date: May 19, 2016

(87) PCT Pub. No.: WO2015/075684
PCT Pub. Date: May 28, 2015

(65) Prior Publication Data
US 2016/0297183 A1 Oct. 13, 2016

(30) Foreign Application Priority Data

Nov. 22, 2013 (CN) .......................... 2013 2 0747488

(51) Int. Cl.
*B32B 27/12* (2006.01)
*B32B 15/02* (2006.01)
(Continued)

(52) U.S. Cl.
CPC ................ *B32B 27/12* (2013.01); *B32B 1/00* (2013.01); *B32B 3/266* (2013.01); *B32B 15/02* (2013.01);
(Continued)

(58) Field of Classification Search
CPC ..... Y10T 428/24298; Y10T 428/24306; Y10T 428/24314; Y10T 428/24322;
(Continued)

(56) References Cited

U.S. PATENT DOCUMENTS 4,256,793 A  3/1981  Cannady, Jr. et al.
4,545,837 A * 10/1985  Wehnert ................ B29C 70/347
                                                      428/137

(Continued)

FOREIGN PATENT DOCUMENTS

CN        102476498 A * 5/2012
DE     202004003214 U1   7/2004
(Continued)

OTHER PUBLICATIONS

Beckley, Philip. (2002). Electrical Steels—for Rotating Machines. 1.1 The Habits of Iron. Institution of Engineering and Technology. Online version available at: app.knovel.com/hotlink/toc/id:kpESRM000P/electrical-steels-rotating/electrical-steels-rotating (Year: 2002).*

(Continued)

*Primary Examiner* — Maria V Ewald
*Assistant Examiner* — Ethan A. Utt
(74) *Attorney, Agent, or Firm* — Harness, Dickey & Pierce, P.L.C.

(57) ABSTRACT

The present invention provides a semi-product made of a prepreg, a three-dimensional preform and an overmolded part. More particularly, the present invention provides a semi-product made of a prepreg, including at least a first (Continued)

prepreg layer and a second prepreg layer, characterized in that a magnetic material layer is laid between the first prepreg layer and the second prepreg layer. Since the magnetic material layer is added between the prepreg layers, the produced semi-product, when being made into a three-dimensional preform and further into an overmolded part, can be well supported and positioned due to attraction to the magnetic material layer by the magnet on the die, and therefore be precisely shaped.

8 Claims, 7 Drawing Sheets (51) Int. Cl.
| | |
|---|---|
| B32B 15/08 | (2006.01) |
| B32B 15/085 | (2006.01) |
| B32B 15/14 | (2006.01) |
| B32B 27/32 | (2006.01) |
| B32B 3/26 | (2006.01) |
| B32B 1/00 | (2006.01) |
| B32B 38/18 | (2006.01) |

(52) U.S. Cl.
CPC ............ *B32B 15/08* (2013.01); *B32B 15/085* (2013.01); *B32B 15/14* (2013.01); *B32B 27/32* (2013.01); *B32B 38/1866* (2013.01); *B32B 2260/023* (2013.01); *B32B 2260/046* (2013.01); *B32B 2262/101* (2013.01); *B32B 2262/106* (2013.01); *B32B 2305/076* (2013.01); *B32B 2307/208* (2013.01); *B32B 2311/00* (2013.01); *B32B 2605/00* (2013.01)

(58) Field of Classification Search
CPC ..... Y10T 428/24331; Y10T 428/31855; Y10T 428/31909; Y10T 428/31913; Y10T 428/31917; Y10T 428/3192; Y10T 428/31924; Y10T 428/31928; Y10T 428/21931; Y10T 428/31935; Y10T 428/31938; Y10T 428/31678; Y10T 428/31692; Y10T 428/31696; Y10T 428/31699; Y10T 428/249951; Y10T 428/24058; Y10T 428/24083; Y10T 428/24091; Y10T 428/24099; Y10T 428/24107; Y10T 428/24124; Y10T 428/24116; Y10T 428/24273–428/24339; Y10T 428/31681; Y10T 428/24074–428/24132; Y10T 428/31685; Y10T 428/31688; Y10T 428/31703; Y10T 428/31707; Y10T 428/3171; Y10T 428/31714; Y10T 428/31717; Y10T 428/31931; B32B 3/24; B32B 3/26; B32B 3/266; B32B 27/00; B32B 27/06; B32B 27/08; B32B 27/12; B32B 15/00; B32B 15/04; B32B 15/08; B32B 15/082; B32B 15/085; B32B 15/18; B32B 27/30; B32B 27/32; B32B 15/14; B32B 15/02; B32B 5/12; B32B 5/22; B32B 5/24; B32B 5/26; B32B 5/02; B32B 5/022; B32B 3/00; B32B 15/088; B32B 15/09; B32B 5/00; B32B 5/024; B32B 5/026; B32B 5/028; B32B 5/08; B32B 5/28; B32B 27/02; B32B 27/04; B32B 27/28; B32B 27/302; B32B 27/304; B32B 2/306; B32B 27/308; B32B 27/34; B32B 27/36; B32B 27/365; B32B 2/024; B32B 5/06; B32B 5/10; B32B 15/06; B32B 15/095; B32B 27/327; B62D 25/10; B62D 25/105; B60J 5/04; B60J 5/048; B60J 5/0484; B60J 5/0481; B60J 5/0483; B60J 5/10; B29C 33/16; B29C 33/32; B29C 3/00; B29C 3/12; B29C 3/14; B29C 3/16; B29C 70/54; B29C 70/541; B29C 70/543; B29C 33/00; B29C 33/12; B29C 33/14; B29C 65/78; B29C 65/7841; B29C 65/785; B29C 69/00; B29C 69/001; B29C 70/88; B29C 70/882; B29C 70/885; B29K 2105/20; B29K 2105/203; B29K 2105/206; B29K 2995/0003; B29K 2995/0008

USPC ..... 428/500, 301.1, 105, 131–140, 112, 458, 428/107–114, 457–468, 515–523; 425/394–401, 412, 422, 436, 436 R, 438, 425/500, 502, 110–112, 3, 397, 400, 425/403.1; 156/272.2, 272.4; 264/106, 264/139, 257, 258, 405

See application file for complete search history.

(56) References Cited

U.S. PATENT DOCUMENTS

| | | | |
|---|---|---|---|
| 4,603,071 A * | 7/1986 | Wehnert | B29C 70/347 |
| | | | 428/137 |
| 4,678,699 A | 7/1987 | Kritchevsky et al. | |
| 6,261,675 B1 | 7/2001 | Hsiao et al. | |
| 2001/0046600 A1 | 11/2001 | Hsiao et al. | |
| 2002/0009935 A1 | 1/2002 | Hsiao et al. | |
| 2002/0011741 A1* | 1/2002 | Gille | B60R 13/00 |
| | | | 296/180.1 |
| 2006/0154052 A1 | 7/2006 | Waffenschmidt et al. | |
| 2009/0053458 A1* | 2/2009 | Birrell | B62D 25/105 |
| | | | 428/68 |
| 2009/0151852 A1 | 6/2009 | Roebroeks | |
| 2010/0140984 A1 | 6/2010 | Murray | |
| 2011/0059293 A1* | 3/2011 | Powell | B32B 15/08 |
| | | | 428/138 |
| 2011/0100749 A1* | 5/2011 | Nonogi | B32B 3/266 |
| | | | 181/291 |
| 2011/0155452 A1* | 6/2011 | Liu | B32B 3/266 |
| | | | 156/242 |
| 2011/0164987 A1* | 7/2011 | Grabau | B29C 70/885 |
| | | | 264/257 |
| 2011/0180209 A1* | 7/2011 | Grabau | B29C 33/16 |
| | | | 156/285 |
| 2011/0187150 A1* | 8/2011 | Hache | B60J 5/101 |
| | | | 296/146.2 |
| 2011/0236622 A1* | 9/2011 | Tacke | B32B 15/08 |
| | | | 428/114 |
| 2013/0271891 A1 | 10/2013 | Shimp et al. | |
| 2013/0280473 A1* | 10/2013 | Preisler | B32B 3/266 |
| | | | 428/133 |
| 2016/0297183 A1 | 10/2016 | Demange et al. | |

FOREIGN PATENT DOCUMENTS

| | | | | |
|---|---|---|---|---|
| EP | 0115103 A1 * | 8/1984 | ............ | B32B 15/08 |
| EP | 1046666 A1 | 10/2000 | | |
| EP | 2159039 A1 | 3/2010 | | |
| JP | 54102385 A * | 8/1979 | | |
| JP | S60-235843 A | 11/1985 | | |
| JP | S61297132 A | 12/1986 | | |
| JP | H2-227220 A | 9/1990 | | |
| JP | H3-264314 A | 11/1991 | | |
| JP | H4-125115 A | 4/1992 | | |
| JP | H4-201252 A | 7/1992 | | |
| JP | H4-247919 A | 9/1992 | | |
| JP | H05-008224 A | 1/1993 | | |
| JP | H5-038774 A | 2/1993 | | |
| JP | H5-185561 A | 7/1993 | | |
| JP | H6-115007 A | 4/1994 | | |

(56) References Cited

FOREIGN PATENT DOCUMENTS

| | | | |
|---|---|---|---|
| JP | H8-258190 A | 10/1996 | |
| JP | H9-099511 A | 4/1997 | |
| JP | H11-129403 A | 5/1999 | |
| JP | 2001-253371 A | 9/2001 | |
| JP | 2001-341670 A | 12/2001 | |
| JP | 2005193628 A * | 7/2005 | |
| JP | 2007-001226 A | 1/2007 | |
| JP | 2007-076081 A | 3/2007 | |
| JP | 2008-265160 A | 11/2008 | |
| JP | 2009-515729 A | 4/2009 | |
| JP | 2011-189747 A | 9/2011 | |
| JP | 2013-538136 A | 10/2013 | |
| KR | 101274572 B1 * | 6/2013 | ............ B29C 70/88 |
| TW | 201215497 A1 * | 4/2012 | |
| TW | 201215498 A1 * | 4/2012 | |
| TW | 201220333 A1 * | 5/2012 | |
| WO | WO-00/13892 A1 | 3/2000 | |
| WO | WO-2004/071761 A1 | 8/2004 | |
| WO | WO-2005/004560 A1 | 1/2005 | |
| WO | WO-2007/037695 A1 | 4/2007 | |
| WO | WO-2012/074083 A1 | 6/2012 | |
| WO | WO-2012/101793 A1 | 8/2012 | |
| WO | WO-2013-153951 A1 | 10/2013 | |
| WO | WO-2014088213 A1 * | 6/2014 | ............ B29C 70/88 |

OTHER PUBLICATIONS

Hand translation of JP 54-102385 A. Translated Apr. 2015. (Year: 2015).*

Machine translation (Espacenet) of CN 102476498 A. Translated Apr. 18, 2019. (Year: 2019).*

Machine translation (Google translate) of TW 201215498 A1. Translated Apr. 24, 2019 (Year: 2019).*

Machine translation (Espacenet) of TW 201220333 A1. Translated Apr. 24, 2019. (Year: 2019).*

Machine translation (Espacent) of TW 201215497 A1. Translated Apr. 24, 2019. (Year: 2019).*

Machine translation (Espacenet) of KR 10-1274572 B1. Translated Apr. 18, 2019. (Year: 2019).*

Machine translation (Espacenet) of JP 2005-193628 A. Translated Oct. 30, 2017. (Year: 2017).*

International Search Report PCT/ISA/210 for International Application No. PCT/IB2014/066239 dated Feb. 25, 2015.

Written Opinion of the International Searching Authority PCT/ISA/237 for International Application No. PCT/IB2014/066239 dated Feb. 25, 2015.

International Search Report PCT/ISA/210 for International Application No. PCT/IB2014/066238 dated Feb. 25, 2015.

Written Opinion of the International Searching Authority PCT/ISA/237 for International Application No. PCT/IB2014/066238 dated Feb. 25, 2015.

Japanese Office Action dated Sep. 25, 2018 for corresponding Japanese Patent Application No. 2016-531996.

Japanese Office Action dated Sep. 25, 2018 for corresponding Japanese Patent Application No. 2016-533196.

U.S. Office Action dated Oct. 26, 2017 in co-pending U.S. Appl. No. 15/037,343.

U.S. Office Action dated May 30, 2018 in co-pending U.S. Appl. No. 15/037,343.

U.S. Allowance Notice dated Sep. 12, 2018 in co-pending U.S. Appl. No. 15/037,343.

European Communication dated Dec. 7, 2018 for corresponding European Patent Application No. 14828053.0.

* cited by examiner

SEMI-FINISHED PRODUCT MANUFACTURED FROM PREPREG, THREE-DIMENSIONAL PREFORMED BODY AND OVERMOLDED PART

CROSS-REFERENCE TO RELATED APPLICATIONS

This application is the U.S. National Phase application of PCT Application No. PCT/IB2014/066239 filed on Nov. 21, 2014, which claims priority to Chinese Application No. 201320747488.5 filed on Nov. 22, 2013, the contents of each of which are incorporated herein by reference.

TECHNICAL FIELD

The present invention relates to the field of prepreg products, and more particularly to semi-products made of prepregs, and three-dimensional preforms and overmolded parts made of the semi-products.

BACKGROUND

A prepreg, an intermediate material commonly used for making a composite material, is usually made of a resin matrix and a reinforcement (such as fibers or fabrics) impregnated in the matrix. The prepreg has higher mechanical strength due to the inclusion of the reinforcement, and is often used to make parts that need to be partially or wholly reinforced, such as motor vehicle components. Commercially available prepregs are often in a sheet or roll form.

The motor vehicle components that need to be reinforced are usually three-dimensional, and sometimes of a complex shape. A known method for making such a three-dimensional component includes the steps of:

Step 1: cutting a purchased prepreg into a suitable shape and dimension (which is obtained by two-dimensionally deploying a desired three-dimensional preform) and stacking a plurality of layers of prepregs of a suitable shape and dimension as required to form a semi-product;

Step 2: heating and then hot stamping the semi-product to form a three-dimensional preform;

Step 3: taking the three-dimensional preform out of a hot stamping die and then mechanically machining (such as contour finishing or drilling) the same after cooling to provide it with a desired final dimension and geometrical configuration;

Step 4: re-heating the three-dimensional preform to a temperature higher than a melting point of a prepreg resin matrix, so as to provide the prepreg resin matrix and an overmolded resin with good adhesion in subsequent overmolding;

Step 5: transferring the hot three-dimensional preform to an overmolding die to overmold a thermoplastic resin portion on the three-dimensional preform by means of injection molding, thereby finally obtaining a three-dimensional component including a reinforcement (composed of the three-dimensional preform) and an overmolded resin portion.

During the processing, a robotic arm is usually used to grab a semi-product or a three-dimensional preform made of a prepreg and then put the same on a retractable needle within a die so as to support and retain the semi-product or the three-dimensional preform made of the prepreg in a position opposite to a forming portion of the die. When it is a long distance for the robotic arm to grab and deliver the semi-product or the three-dimensional preform made of the prepreg, or when the die is still in an open state, such a needle seems to be particularly necessary.

However, there must be a needle control means included in an apparatus in order to control the aforesaid needle, so an additional space is required. Additionally, these tapered needles may leave holes in the semi-product, or leave cones in the three-dimensional preform after injection of thermoplastics. Moreover, when the semi-product or the three-dimensional preform made of the prepreg is heated until the prepreg resin matrix softens, the operation thereof becomes tougher, and the use of the needle alone cannot support and position it well.

In order to support and position the semi-product or the three-dimensional preform made of the prepreg in the processing, in addition to a technical solution using a needle, there is also a known solution using a molding frame, in which a prepreg floating suspension system is adopted. The semi-product or three-dimensional preform, however, may slide between mold cavities during forming, so the system cannot precisely position the semi-product or three-dimensional preform in the die all the time.

Thus, it is required to provide an alternative that can better support and position the semi-product or three-dimensional preform during the processing, in particular, the thermo processing thereof.

SUMMARY OF THE INVENTION

The object of the present invention is to solve the above technical problems.

To this end, the present invention provides a semi-product made of a prepreg, including at least a first prepreg layer and a second prepreg layer, characterized in that a magnetic material layer is laid between the first prepreg layer and the second prepreg layer.

The term "prepreg" is an intermediate material commonly used for making a composite material and has a common meaning in the field of composite materials, i.e., a combination of a resin matrix and a reinforcement obtained by impregnating the reinforcement with the resin matrix under strictly controlled conditions.

The term "semi-product" is an intermediate product which still needs to be further processed for making a final product.

The term "magnetic material" refers to a material that can be attracted by a magnet.

According to the present invention, since a magnetic material layer is added between the prepreg layers, the produced semi-product, when being made into a three-dimensional preform and further into an overmolded part, can be well supported and positioned due to attraction to the magnetic material layer by the magnet on the die, and therefore be precisely shaped.

The semi-product according to the present invention may also include one or more of the following features:

At least one of the first prepreg layer and the second prepreg layer has a cut-out portion, and the magnetic material layer is at least laid in at least one of the cut-out portions. The magnet on the die can be arranged in such a way that the magnet is at least partially inserted into the cut-out portion when the die is closed, so the magnet is in direct contact with the magnetic material layer at the cut-out portion in order to provide sufficiently large magnetic force to the semi-product or the three-dimensional preform, thereby supporting and positioning the semi-product or the three-dimensional preform in a better way.

Preferably, when thermoplastic resin contained in the first prepreg layer and the second prepreg layer is softened, the magnetic material layer still exhibits magnetic properties and can be attracted by a magnet. Thus, the semi-product, when being made into a three-dimensional preform and further into an overmolded part by a thermoforming process (such as hot stamping), can be supported and positioned due to attraction to the magnetic material layer by the magnet on the die.

Preferably, when thermoplastic resin contained in the first prepreg layer and the second prepreg layer is softened, the magnetic material layer still remains in a solid state. Those skilled in the art can select a suitable magnetic material according to the characteristics of the thermoplastic resin used, so that the magnetic material layer is not yet molten when the semi-product is heated to make the thermoplastic resin softened, in such a manner that the prepreg layer can be better supported during thermoforming.

Preferably, the magnetic material layer is a magnetic metallic net, or a magnetic metallic sheet, or a combination thereof. Since a metal usually has higher mechanical strength and the added magnetic material layer is retained in the final overmolded product, it can also enhance the mechanical strength of the product and serve as a supplementary reinforcement. In particular, when the magnetic material layer is a magnetic metallic net or metallic sheets that are not interconnected into one piece and have gaps therebetween, meshes or gaps help to reduce the weight of final products and save product costs. Moreover, in the subsequent processing (such as hot stamping) of the semi-products, the adjacent layers of the prepreg resin matrixes can fuse and connect together through the meshes or gaps, thereby fixing the metal layer between the two prepreg layers more firmly.

Preferably, a polypropylene film is laid between the first prepreg layer and/or the second prepreg layer and the magnetic material layer. In particular, since the polypropylene film can fill in the metallic meshes or the gaps between the metallic sheets to discharge the air entrapped therein, the uniformity of the product can be improved greatly. Further, this is also advantageous for enhancing adhesion between the metal layer and the prepreg layers.

The present invention also relates to a three-dimensional preform, characterized in that it is made of the semi-product by means of hot stamping.

In addition, the present invention also relates to an overmolded part, characterized in that it comprises at least one aforesaid three-dimensional preform and a thermoplastic resin portion overmolded on the three-dimensional preform.

Preferably, the overmolded part is a motor vehicle component, and in particular a rear closing component of a motor vehicle.

BRIEF DESCRIPTION OF THE DRAWINGS

The present invention will be described in more detail hereinafter with reference to the drawings. It should be readily appreciated by those skilled in the art that the drawings described herein are for illustration purposes only and are not intended to limit the scope of the present invention in any way. Identical or like structures are indicated with identical or like reference numerals. For illustration purposes, these drawings are not necessarily drawn in proportion.

DETAILED DESCRIPTION OF THE EMBODIMENTS

Figure 1:
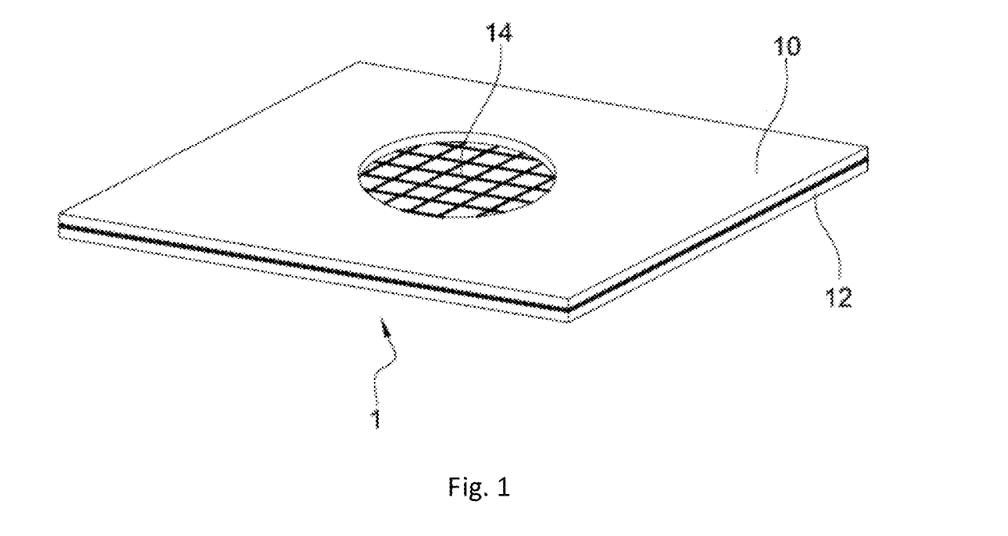
FIG. 1 is a perspective view of a semi-product made of a prepreg according to an embodiment of the present invention.
Figure 2:
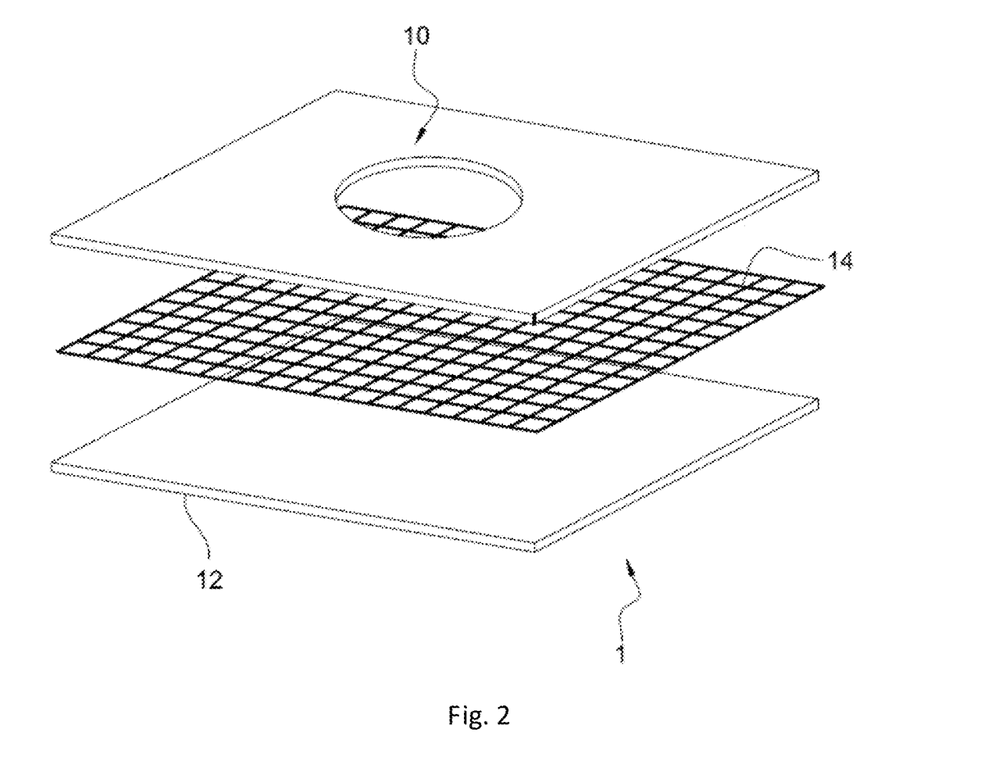
FIG. 2 is an exploded perspective view of the semi-product of FIG. 1.

FIG. 1 shows a perspective view of a semi-product 1 made of a prepreg according to an embodiment of the present invention. FIG. 2 better shows the structure of the semi-product 1 in an exploded view. In the embodiment, the semi-product 1 comprises a first prepreg layer 10, a second prepreg layer 12 and a magnetic material layer 14 sandwiched therebetween. It can be appreciated that the semi-product 1 can comprise more prepreg layers and/or layers of other materials. At least a portion of these layers of other materials can be attracted by a magnet, i.e., at least a portion of them are magnetic material layers, which can be determined by those skilled in the art according to specific design targets. For instance, in an embodiment, the semi-product 1 comprises a first, a second and a third prepreg layer stacked one on top of the other, and a magnetic material layer is sandwiched between every two adjacent prepreg layers. In another embodiment, the semi-product 1 comprises a first, a second and a third prepreg layer stacked one on top of the other, but a magnetic material layer is only sandwiched between the first and the second prepreg layer. It should be noted that the magnetic material layer can cover the full surface of the prepreg layers, or can be arranged discretely at one or more locations.

The term "prepreg" represents an intermediate material commonly used for making a composite material and most often composed of a resin matrix and a reinforcement (such as fibers or fabrics) impregnated in the matrix. In the present embodiment, the first prepreg layer 10 and the second prepreg layer 12 are both composed of a thermoplastic resin matrix and a reinforcement impregnated in the matrix, and the reinforcement can be carbon and/or glass fibers or fabrics. The magnetic material layer 14 can be made of any suitable magnetic material (such as iron, cobalt, nickel and an alloy thereof) that can be attracted by a magnet. In the present embodiment, the magnetic material layer 14 is a metallic net with meshes, which reduces the weight of the final product and save production costs. It should be appreciated that the magnetic metallic net can be replaced by magnetic metallic sheets. In this case, the magnetic metallic sheets may not be interconnected into one piece, but with gaps, so as to reduce the weight of the final product and save production costs. Moreover, in the subsequent processing (such as hot stamping) of the semi-products, the adjacent layers of the prepreg resin matrixes can fuse and connect together through the meshes or gaps, thereby fixing the metallic layer between the two prepreg layers more firmly. It can be observed in the embodiment shown in FIGS. 1 and 2 that the first prepreg layer 10 has a cut-out portion 18, through which a magnetic metallic net 14 is visible, and the second prepreg layer 12 has the same shape and dimension as that of the magnetic metallic net 14. In the embodiment shown in FIG. 3, the cut-out portion 18 is provided in the second prepreg layer 12. Thus, in the subsequent processing step, the magnet on the die is arranged in such a way that the magnet is at least partially inserted into the cut-out portion of the prepreg layer of the semi-dimensional preform or the semi-product when the die is closed, so the magnet is in direct contact with the magnetic material layer at the cut-out portions in order to provide sufficiently large magnetic force to support and position the semi-product or the three-dimensional preform in a better way. Moreover, the three-dimensional preform (see FIGS. 4 to 7) made of the semi-product 1 can be at least partially supported by the material layer 14 during a heating process to well maintain its three-dimensional shape.

It should be appreciated that these cut-out portions in the prepreg layer can have a simple or more complex geometrical shape. In the presence of cut-out portions, the magnetic material layer is laid at at least one cut-out portion. Of course, there may be no cut-out portions at all, and the area where the magnetic material layer is to be placed should not be limited to the above embodiments. In fact, according to the present invention, anything is possible as long as the magnetic force between the magnet and the magnetic material layer is sufficient to well support and position the semi-product or the three-dimensional preform during the processing.

Figure 3:
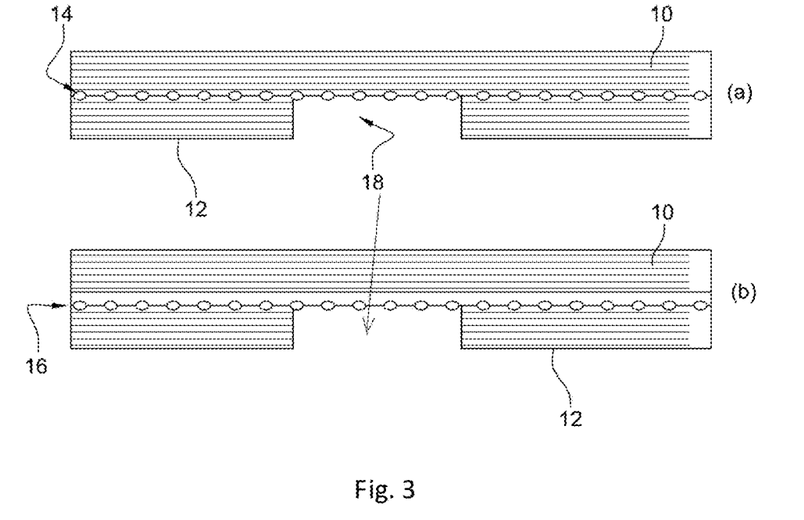
FIG. 3 contains cross-sectional views of the semi-product according to an embodiment of the present invention with or without a polypropylene film, respectively.

Moreover, as shown in FIG. 3(b), it is preferable that a polypropylene film 16 is laid between the magnetic material layer 14 and its adjacent prepreg layer 10 and/or 12. Since the polypropylene film can fill in the metallic meshes or gaps between the metallic sheets to discharge the air entrapped therein, the uniformity of the product can be improved greatly. Further, this is also advantageous for enhancing adhesion between the material layer and the prepreg layers.

Figure 4:
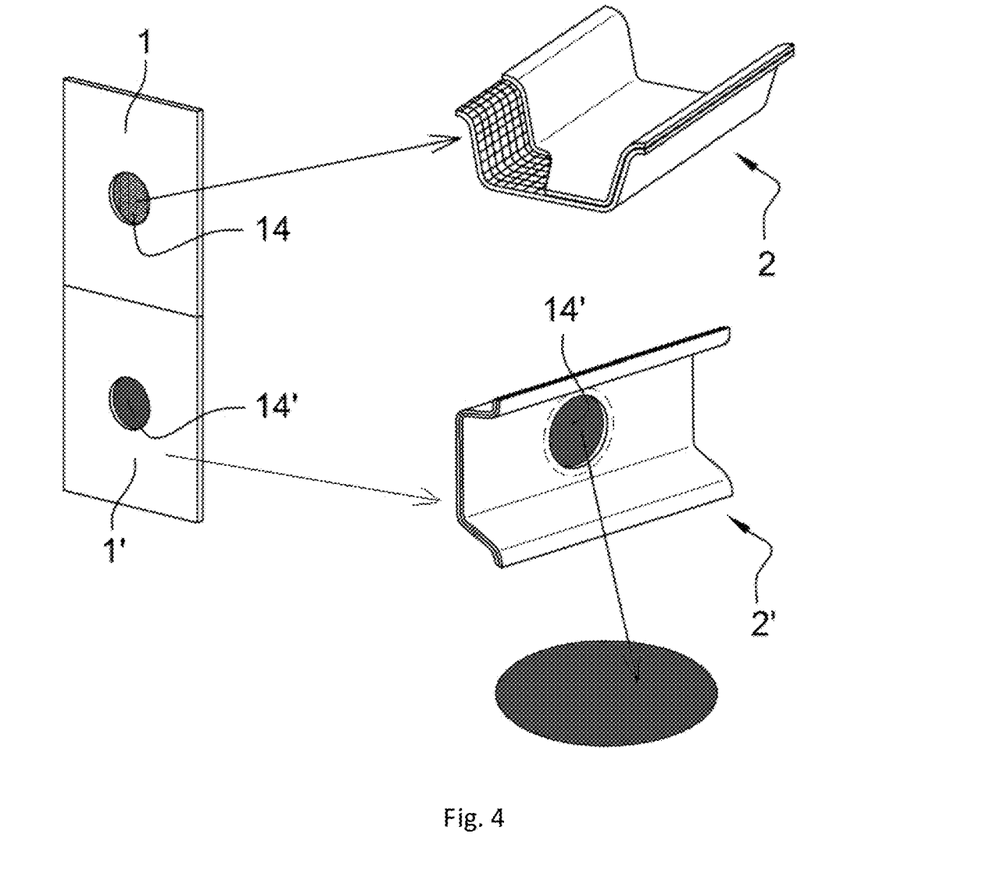
FIG. 4 shows the process of machining the semi-products into the three-dimensional preforms according to two different embodiments of the present invention.

FIG. 4 shows the process of machining the semi-products 1 and 1' of FIG. 1 into the three-dimensional preforms 2 and 2'. As shown, the difference between the semi-product 1 and the semi-product 1' lies in whether the magnetic material layer therein is a magnetic metallic net 14 or a magnetic metallic sheet 14'. The three-dimensional preforms respectively obtained therefrom are denoted by 2 and 2'. For showing the structure of the three-dimensional preforms 2 and 2' clearly, a portion of the second prepreg layer 12 is removed from FIG. 4.

Figure 5:
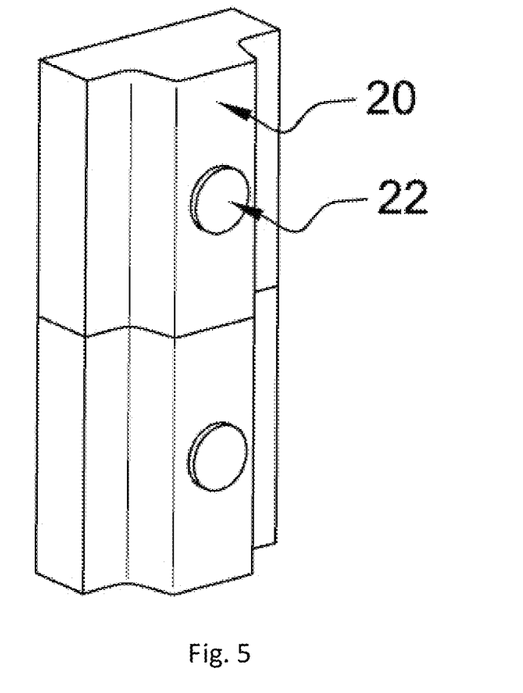
FIG. 5 shows a forming die used in the process of FIG. 4.

The semi-products 1 and 1' are heated before being placed into a forming die. Then, the hot semi-product 1 is placed into the forming die as shown in FIG. 5 (including a hot stamping punch 20 in FIG. 5) so that a magnet 22 on the punch 20 aligns with the cut-out portion in the prepreg layer of the semi-product where the magnetic material layer is exposed so as to support and maintain the semi-product in position with the help of a magnetic force for subsequent three-dimensional forming thereof. It should be noted that in the forming step, the magnetic material layer in the semi-products 1 and 1' is formed as well. Thereafter, the semi-products are demoulded to obtain the three-dimensional preforms 2 and 2'. It should be appreciated that the three-dimensional shapes as shown in FIG. 4 are for illustration purposes only, and the three-dimensional preforms 2 and 2' can have more complex three-dimensional shapes for different applications.

Figure 6:
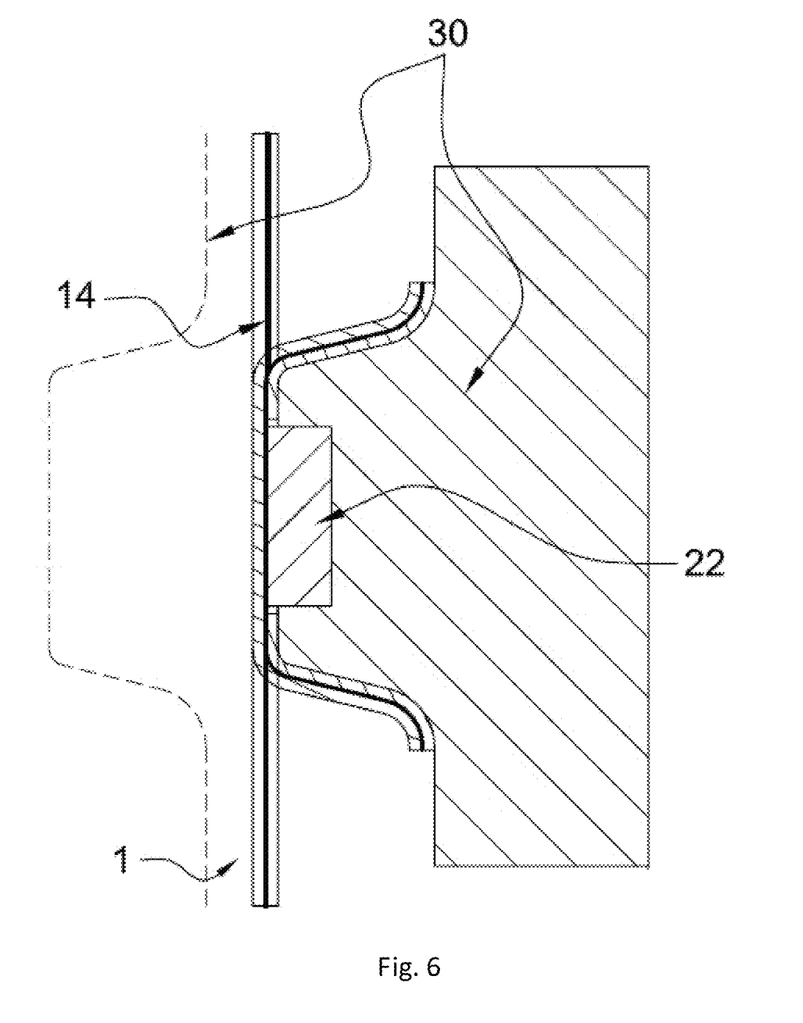
FIGS. 6 and 7 are respectively a cross-sectional view of the forming apparatus used in the process of FIG. 4.
Figure 7:
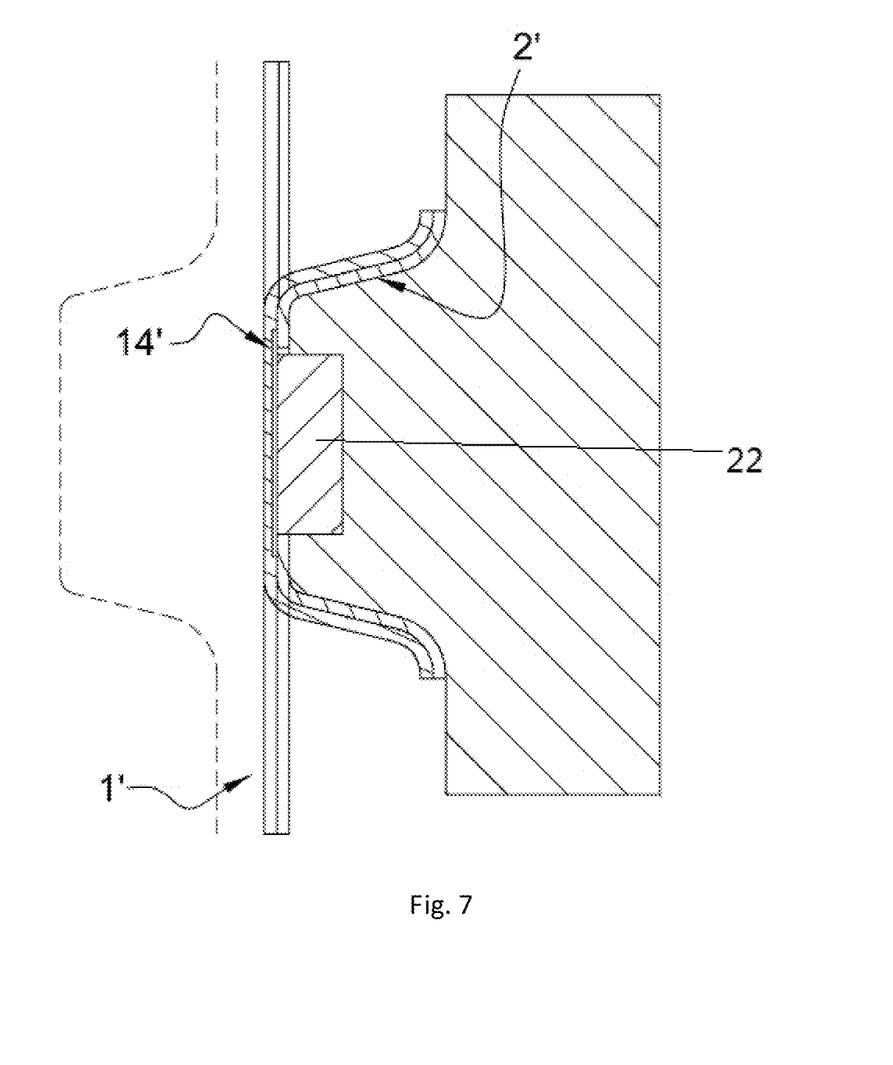

FIGS. 6 and 7 schematically show the cross-sectional views of the forming apparatus used in the process, wherein FIG. 6 shows a molding portion 30 of the die. It should be appreciated that the shape of the die is not limited to that shown in the drawings, and the schematic view is also applicable to the process of overmolding the three-dimensional preform. In particular, it should be noted that the magnetic metallic sheet 14' as shown in FIG. 7 is only laid at the cut-out portion in the prepreg layer while fully covering the cut-out portion, such that the magnet 22 on the molding portion is partially inserted into the cut-out portion and in direct contact with the magnetic metallic sheet 14' when the die is closed, so as to provide sufficient attraction to the semi-product or the three-dimensional preform. However, the area where the magnetic metallic sheet 14' should be placed is not limited to the embodiment.

Figure 8:
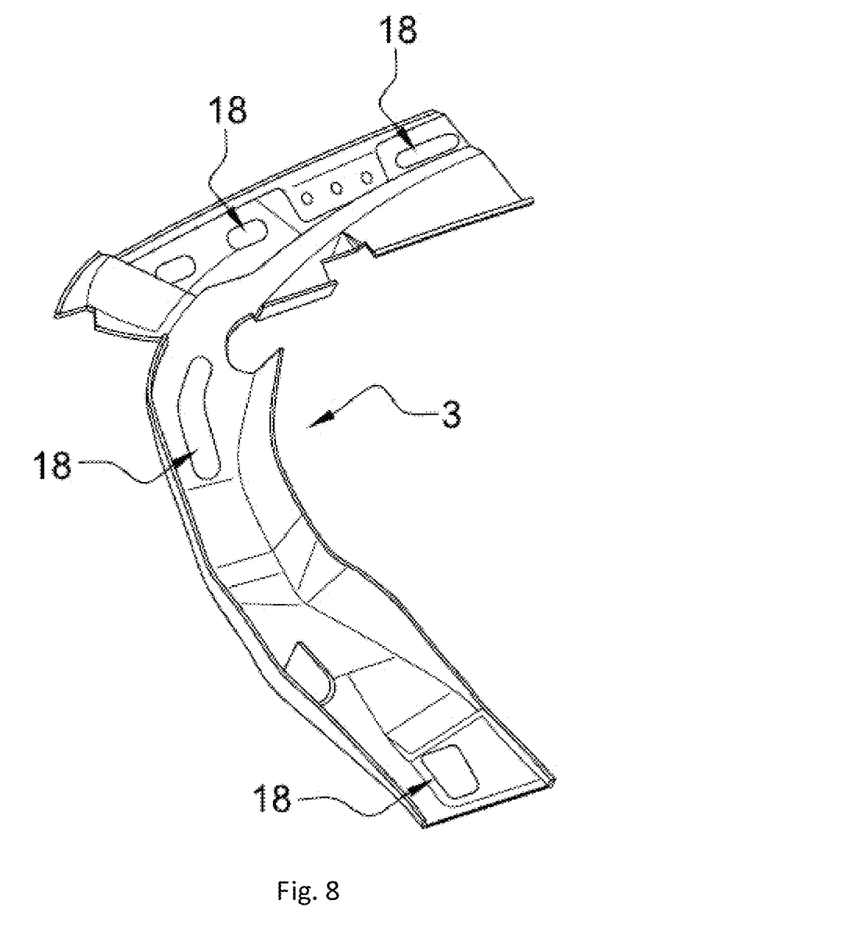
FIG. 8 is a perspective view of a three-dimensional preform according to an embodiment of the present invention.

The three-dimensional preform 2 or 2' can be mechanically machined (such as contour finished or drilled) after cooling so as to make it into the one of a desired final dimension and geometrical configuration. FIG. 8 shows an example of the three-dimensional preform, wherein it is a rear reinforcement 3 of a motor vehicle, and FIG. 8 schematically shows the cut-out portions 18 which receive the magnets on the die to provide support thereto during the processing.

Figure 9:
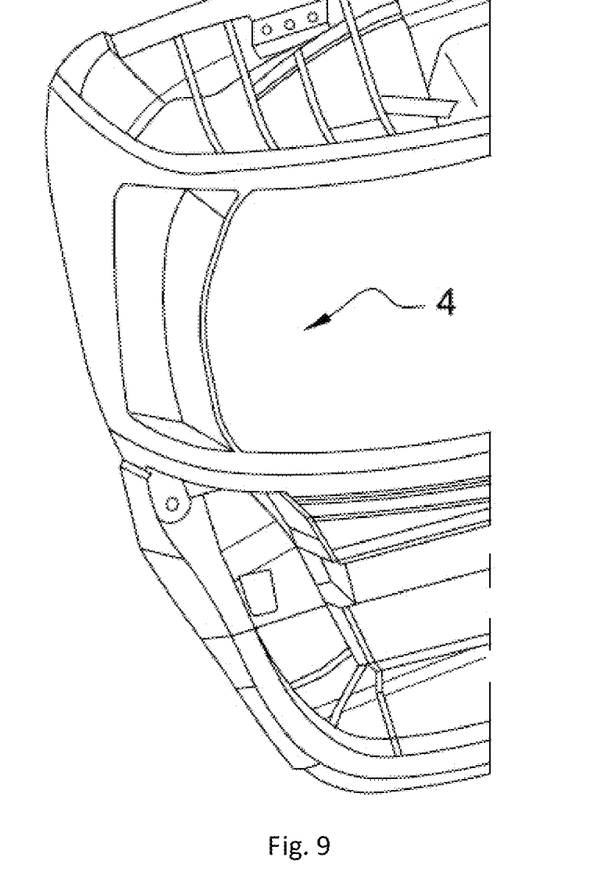
FIG. 9 is a perspective view of an overmolded part of the three-dimensional preform of FIG. 8.

Then, the three-dimensional preform is reheated to a temperature higher than the melting point of the prepreg resin matrix, so as to provide good adhesion between the prepreg resin matrix and the overmolded resin in the subsequent overmolding step. The hot three-dimensional preform is transferred to an overmolding die for an overmolding step therein, i.e., overmolding a thermoplastic resin portion on the three-dimensional preform (for instance, by means of injection molding). Demould to obtain a final three-dimensional component including a reinforcement (composed of the three-dimensional preform) and an overmolded resin portion. The resultant three-dimensional component can be for example a component of a motor vehicle. FIG. 9 shows an example of the three-dimensional component, wherein it is an automobile trunk closing component 4 composed of the prepreg three-dimensional preform (namely, an automobile rear reinforcement 3) having the magnetic material layer and the overmolded resin portion.

The drawings and the above description describe the non-limitative particular embodiments of the present invention. Some conventional aspects have been simplified or omitted in teaching the invention principle. Those skilled in the art should know that the variations from these embodiments fall into the scope of the present invention. It should be understood by those skilled in the art that the above features can be combined in various ways to form a plurality of variations of the present invention. Thus, the present invention is not limited to the above particular embodiments, but defined by the following claims and their equivalents.

The invention claimed is:

1. A semi-product made of a prepreg, the semi-product comprising:
at least a first prepreg layer and a second prepreg layer, and
a magnetic material layer between the first prepreg layer and the second prepreg layer,
wherein when thermoplastic resin contained in the first prepreg layer and the second prepreg layer is softened, the magnetic material layer retains magnetic properties thereof and can be attracted by a magnet, wherein at least one prepreg layer of the first prepreg layer and the second prepreg layer has a cut-out portion, and the magnetic material layer is at least laid in at least one of the cut-out portions.

2. The semi-product according to claim 1, wherein when the thermoplastic resin contained in the first prepreg layer and the second prepreg layer is softened, the magnetic material layer remains in a solid state.

3. The semi-product according to claim 1, wherein the magnetic material layer is a magnetic metallic net, or a magnetic metallic sheet, or a combination thereof.

4. The semi-product according to claim 3, wherein a polypropylene film is between the first prepreg layer and/or the second prepreg layer and the magnetic material layer.

5. A three-dimensional preform, wherein the three-dimensional preform includes the semi-product according to claim 1.

6. An overmolded part, comprising:
at least one three-dimensional preform according to claim 5; and
a thermoplastic resin portion overmolded on the at least one three-dimensional preform.

7. The overmolded part according to claim 6, wherein the overmolded part is a motor vehicle component.

8. The overmolded part according to claim 7, wherein the overmolded part is a rear closing component of a motor vehicle.

* * * * *

UNITED STATES PATENT AND TRADEMARK OFFICE
CERTIFICATE OF CORRECTION

PATENT NO. : 10,427,386 B2  
APPLICATION NO. : 15/037803  
DATED : October 1, 2019  
INVENTOR(S) : Jean-Yves Demange et al.

Page 1 of 1

It is certified that error appears in the above-identified patent and that said Letters Patent is hereby corrected as shown below:

On the Title Page

Item (71) Applicant should read: Compagnie Plastic Omnium, Lyon (FR)

Item (73) Assignee should read: Compagnie Plastic Omnium, Lyon (FR)

Signed and Sealed this  
Twenty-fourth Day of November, 2020

Andrei Iancu  
*Director of the United States Patent and Trademark Office*